United States Patent [19]

Vilaire et al.

[11] Patent Number: 5,227,619

[45] Date of Patent: Jul. 13, 1993

[54] DEVICE FOR DETERMINING THE DIRECTION OF A LOW-LUMINOSITY EMISSIVE SOURCE AND ITS USE IN STELLAR OBSERVATION

[75] Inventors: Didier Vilaire, Paris; Christian Pezant, Villecresnes, both of France

[73] Assignee: U.S. Philips Corporation, New York, N.Y.

[21] Appl. No.: 834,024

[22] Filed: Feb. 11, 1992

[30] Foreign Application Priority Data

Feb. 15, 1991 [FR] France ................. 91 01815

[51] Int. Cl.$^5$ ............................................. G01B 11/26
[52] U.S. Cl. .................... 250/206.2; 356/152; 250/203.3
[58] Field of Search ............... 250/203.3, 203.6, 206.2, 250/206.3, 206.4; 356/141, 152; 244/3.16

[56] References Cited

U.S. PATENT DOCUMENTS

| | | | |
|---|---|---|---|
| 3,640,628 | 2/1972 | Jones ................... | 250/203.3 |
| 4,710,028 | 12/1987 | Grenier et al. ........... | 356/141 |
| 4,713,533 | 12/1987 | Bremer et al. .................. | 250/203.1 |
| 4,740,681 | 4/1988 | Tsuno ................... | 356/152 |
| 4,950,881 | 8/1990 | Kaltschmidt ............... | 250/203.6 |
| 5,068,522 | 11/1991 | Falp et al. ............. | 250/203.3 |
| 5,081,345 | 1/1992 | Grenier et al. ............... | 356/141 |

FOREIGN PATENT DOCUMENTS 0135065 3/1985 European Pat. Off. .
2598019 4/1986 France .

OTHER PUBLICATIONS

PCT Application WO/90/13199 Published Nov. 1, 1990.

Primary Examiner—David C. Nelms
Assistant Examiner—S. Allen
Attorney, Agent, or Firm—Robert J. Kraus

[57] ABSTRACT

The device includes an objective (12) and a photosensitive detection matrix CCD (110) provided with a read register and an output stage. According to the invention, the device furthermore includes read means (13) for reading the matrix, in groups of 4 or 9 pixels arranged in a square, these groups being arranged in quincunx, and for determining the brightest square group.

4 Claims, 2 Drawing Sheets

DEVICE FOR DETERMINING THE DIRECTION OF A LOW-LUMINOSITY EMISSIVE SOURCE AND ITS USE IN STELLAR OBSERVATION

BACKGROUND OF THE INVENTION

The present invention relates to a device for determining in the search mode the direction of a low-luminosity emissive source, having a lens forming an image of the emissive source on a photo-sensitive detector constituted by a charge-coupled detection matrix comprising a read register and an output stage of the read register.

A particular advantageous application of the device according to the invention consists in the detection of low-luminosity stars (of great magnitude) in the presence of significant background noise.

With the object of obtaining the two information components (in cartesian coordinates) allowing the complete determination of the observed luminous object, it is known, more specifically from the U.S. Pat. No. 4,430,673 to utilize a photo-sensitive detector constituted by a charge-coupled detection matrix. This detector is in the form of a mosaic of picture elements (pixels) divided into two halves: a first half, the photo-sensitive zone is intended to receive and detect the luminous radiation coming from the observed object, and the second half, coated or not coated with an opaque film, serves as an analog memory in which, by charge transfer, the information components received by the first half of the matrix during a so-called integration period, are stored. The two halves of the matrix detector preferably have separate charge transfer controls. Thereafter a read register receives, still by charge transfer, line sequentially, the information components contained in the memory zone, thereafter these information components are applied in the analog form to an output stage from which they can be read pixel by pixel in such a manner as to enable the recovery, in digital form, of the image previously obtained on the photosensitive zone. More specifically for celestial observation, a first mode of operation of the device, the search mode, consists in defining, in a detection sub-matrix, what is called the search window incorporated in the matrix described in the foregoing, the position with an accuracy of one pixel, of the desired luminous object, it being understood that the search window was previously defined by means of, for example, an inertial sensor mounted in the same apparatus as the device for sighting the luminous object. Irrespective of its magnitude, the observed luminous object, generally a star, provides, in the detection matrix, a luminous spot whose diameter is less than the diameter of the pixel, it being assumed that the focusing effected by the objective is correct. In the search mode, the pixel which thus receives the total signal from the emissive source (the star) looked for, renders it possible to obtain the above-indicated direction by furnishing the direction of the star by its coordinates with an accuracy of 0.5 time the side of a pixel. However, the search mode is generally followed by a second, so-called measuring mode which has for its object to determine with a still better precision (in a ratio of 10, approximately) the direction of the star. For the measuring mode the star image on the detector matrix is defocused in a such a manner that it covers a surface greater than the surface of a pixel and the energy centre of the star image on the matrix is determined by barycentric calculation of the pixels, more specifically of the pixels subjected to the defocused radiation of the star searched for. In this case, no provisions have been taken to modify the focusing between the search mode and the read mode. The invention can be used in the field in which there is either no defocusing or such a permanent fixed defocusing that the image of the emissive source has a diameter greater than a side of a pixel and preferably being in the order of 2 to 2.5 times this side. The invention is particularly advantageous for use in the event of defocusing.

The precise technical problem encountered in the said field is to collect, in the search window, with an accuracy of the order of one pixel side and with the best possible signal-to-noise ratio, the maximum possible signal of the star searched for.

SUMMARY OF THE INVENTION

This technical problem is solved and the drawbacks of the prior art are mitigated because of the fact that the search device defined in the opening paragraph, is characterized in that, in accordance with a first preferred embodiment, it further includes read means for reading a detection sub-matrix containing the said image, in groups of 4 or 9 pixels arranged in a square, the said reading operation being performed by successively transferring in the read register lines arranged in groups of 2 or 3 lines, thereafter by successively transferring in the output stage elements of the read register arranged in groups of 2 or 3 elements, whilst shifting two successive transfers from the read register for the duration of an element of this register so as to obtain read signals of groups of 4 or 9 pixels of the sub-matrix arranged in a quincunx and to determine in this way the square zone of 4 or 9 pixels of the sub-matrix in correspondence with the said image in the sub-matrix.

For a static star, the signal related to the highest-level pixel in the image spot, may in the least favourable case represent only 20% of the signal received from the star, the image spot extending in equal portions over 4 pixels. To improve the detection probability whilst obviating the disadvantage described in the preceding line, the search is effected, in accordance with this first embodiment, by accumulating the charges of square groups of pixels distributed in quincunx, so that whatever the position of the image spot in the matrix, one of the groups collects at least one third of the star signal in the case in which the diameter thereof is twice the length of the side of the pixel. This first embodiment is effective in that the accumulation of charges is directly effected at the level of the matrix. Thus it is avoided that, at the same time as the integrated signal, the read noise linked with each pixel, i.e. the inherent noise of the detector, the noise introduced by the analog processing chain and the quantization noise, are accumulated.

In accordance with a second preferred embodiment of the invention, the search device defined in the opening paragraph, is characterized, in that it further includes storage means for storing the read signal coming from a detection sub-matrix, containing the said image, pixel-sequentially, and read and information calculating means constituted by a microprocessor for:

extracting from said storage means the information of the assembly formed by the separate groups of 4 and 9 pixels, respectively, arranged in a square, group by group, adding together the information contained in the memory location of each group, determining the square zone of 4 and 9 pixels, respectively, of the brightest of the sub-matrix corresponding to the said image in the sub-matrix.

This second solution, which may be defined as a data processing solution, of the technical problem to be solved, is not optimal as regards the signal-to-noise ratio; on the other hand, however, it takes up more memory locations, which is expensive for spatial applications wherein the bipolar technique is to be used, which consumes a great deal of energy. On the other hand, it renders it possible to obtain the maximum possible signal from the searched star, that is to say at least two thirds of this signal, using the same hypothesises as in the foregoing for the first embodiment.

For the two embodiments, the slight loss in precision due to the grouping of the pixels (4 or 9 instead of 1) is compensated for by the gain in level obtained for the searched star, which is the most important in the search stage.

A further advantage, inherent to the first embodiment, is that it allows faster reading of the detection matrix, by reading the lines in groups of two or three in the read register which proportionally shortens the search stage.

It will be noted that the basic idea of the invention consists in having the least possible fluctuation in the star signal as a function of its position in the field forming the pixels of the detection matrix.

BRIEF DESCRIPTION OF THE DRAWING

The following description given with reference to the accompanying drawing figures by way of non-limitative example, will make it better understood how the invention may be put into effect.

DESCRIPTION OF THE PREFERRED EMBODIMENTS

Figure 1:
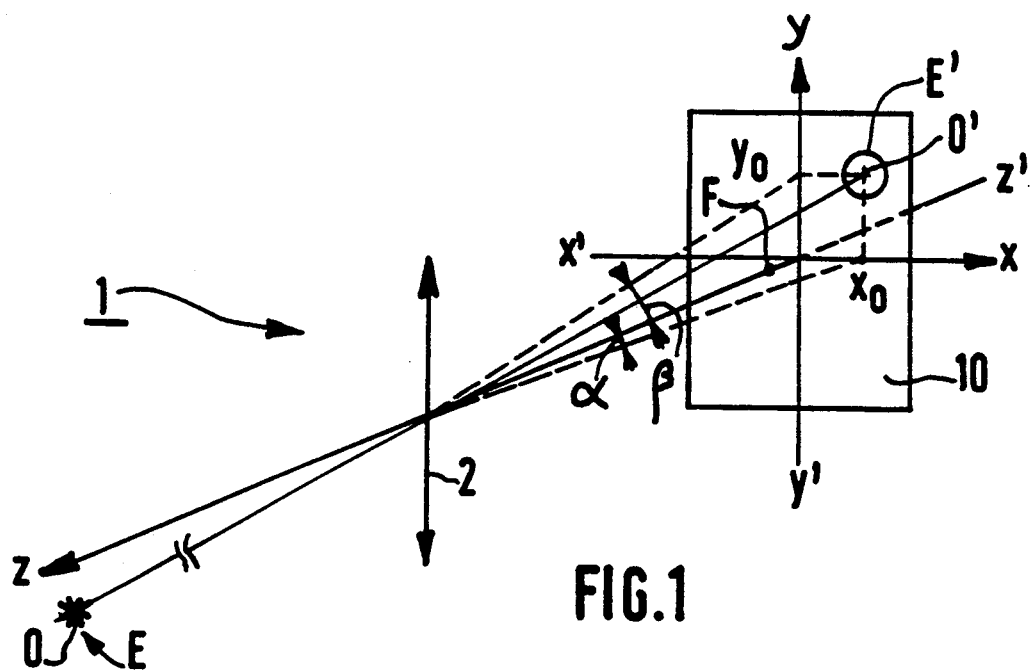
FIG. 1 is a perspective circuit diagram of a search device in accordance with the invention.

FIG. 1 schematically shows an astronomical viewfinder denoted by reference numeral 1 and, more generally a detector for determining the position of a low-luminosity emissive source. This viewfinder or position detector comprises an objective 2 which of the luminous object (star) E, which may be assumed to be in the shape of a pinpoint and consequently merges with its centre 0, forms an image E′ having a centre 0′ on a photosensitive detector 10. The detector 10 is a charge-coupled matrix located, for example, close to the focal point of the objective 2, that is to say whose position relative to the object is adjustable, but for a slight permanent defocusing such that the image spot E′ of the luminous object covers several element detectors (picture elements or pixels). It should be noted that, whatever the magnitude of the luminous object under observation, the diameter of the object, slightly defocused, is substantially constant on the matrix and is, for example, equal to twice the side r of a pixel, it being assumed that the pixels are square, the quantity of photons received being a function of the magnitude of the luminous object aimed at. The energy centre 0′ of the image E′ is denoted by its coordinates $x_0$ and $y_0$ in a system of axes Fx, Fy linked with the matrix 10. The determination of $x_0$ and $y_0$ allows the calculation of the angles $\alpha$ and $\beta$ which define the direction 0′0 searched for with respect to the optical axis z′z′ of the viewfinder 1.

Figure 2A:
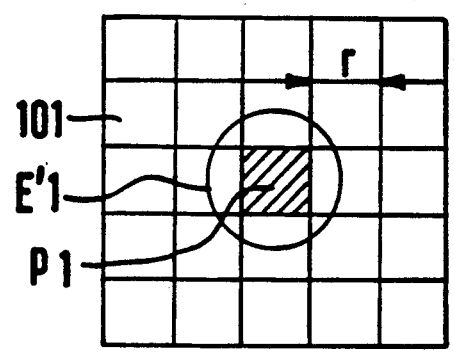
FIGS. 2a and 2b show the energy distribution of the image spot produced by the emissive source on the detection matrix.
Figure 2B:
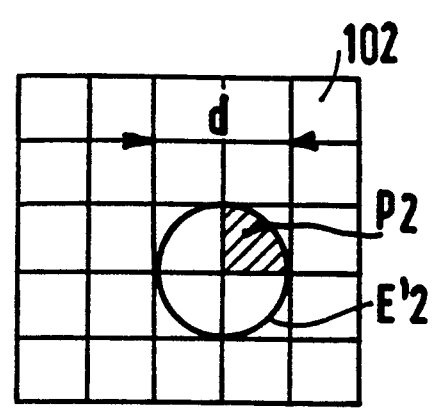

FIGS. 2a and 2b show a sub-matrix 101 and 102, respectively, of the matrix 10 in which the image spot E′1 and E′2, respectively, having a diameter $d(d=2r)$ appears. The sub-matrix 101 or 102 symbolizes the search window which in actual practice comprises a number of pixels distinctly greater than 25. In FIG. 2a, 9 pixels are affected by the image spot, the centre pixel P1 receiving itself already 35.1% of the radiation given off by the luminous object E. In FIG. 2b, only 4 pixels are affected to the same extent, each one of these 4 pixels, for example pixel P2 only receiving 20.4% of the radiation given off by E. The star being a priori the brightest source in the search window, the detection is generally effected, in known manner, by searching for the pixel having the maximum level. However, when stars of a high magnitude are in the viewfinder or in the case of a considerable background, the detection probability, i.e. the probability that the pixel having the maximum level indeed belongs to the image of the star, becomes highly dependent on the position of the image spot in the matrix. Actually, in the most unfavourable case shown in FIG. 2b, for a static star, the signal linked with the maximum-level pixel in the image spot represents only one-fifth of the star signal.

To improve the detection probability whilst obviating the above disadvantage, the search is effected, in accordance with the invention, by accumulating the charges in groups of 4 or 9 pixels, arranged in a square in a particular manner.

Figure 3:
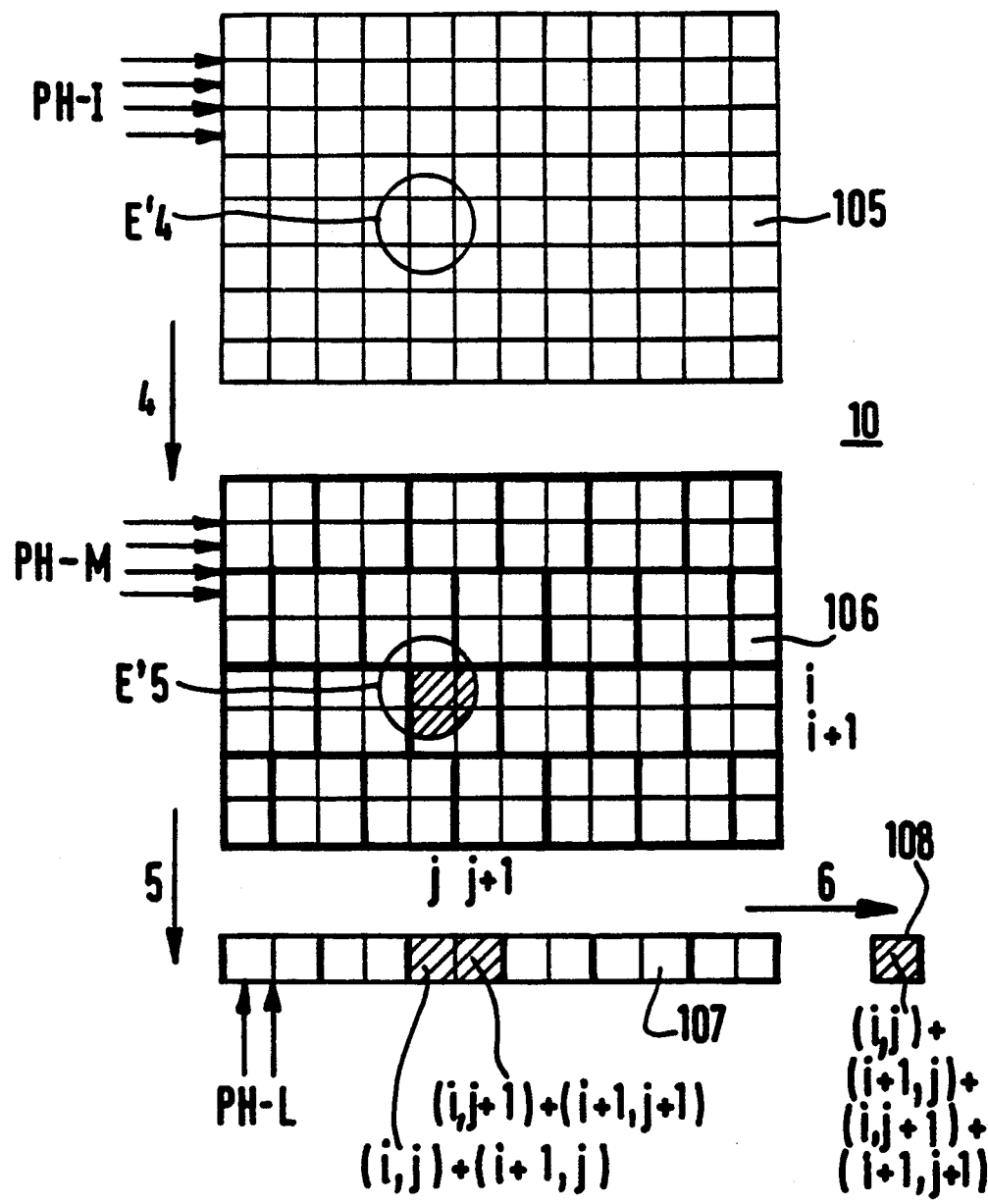
FIG. 3 represents the detection matrix of a first embodiment of the invention.

In accordance with a first embodiment, illustrated by FIG. 3, the square groups of pixels are distributed in a quincunx. FIG. 3 symbolically represents a charge-coupled matrix 10 whose edges are not shown in the drawing. This device, for example, the device marketed by the firm of Thomson-CSF under type designation TH 7863, is in the form of a mosaic of picture elements divided into two portions: a first half 105, the photo-sensitive zone, is intended to receive and detect the luminous radiation coming from the object in the viewfinder and the second half 106, which is coated by an opaque film, serves as a memory in which, by line-sequential charge transfer, the information components received from the first half of the matrix, are stored. The said charge transfer occurs in known manner by acting on the control phases PH-I of the photo-sensitive zone towards the memory zone, as indicated by the arrow 4. The signal from the star is then integrated in the photo-sensitive zone and forms the image spot E′4, whereafter the image is transferred, in the direction of the arrow 4, towards the memory zone as shown in E′5. The matrix 10 also includes a read register 107 and an output stage 108 of the read register. The useful zone, i.e. typically the search window which forms a detection sub-matrix, or a sub-assembly previously known from the portion 105, thereafter from 106, is sequentially transferred two lines at a time into the read register 107, by acting on the control phases PH-M of the memory portion 106 in the direction indicated by the arrow 5. The pixel charges of the lines i and i+1 are thus cumulated. The same action is performed (2 elements by 2 elements) for the transfer of charges of the read register towards the output stage by appropriately acting on the control phases PH-L in the direction of the arrow 6; j and j+1 being the rows of columns affected by the image spot, the charges of the pixels (i, j), (i,j+1), (i+1, j) and (i+1, j+1) of the memory portion 106 are accumulated in 108 at the output of the read register 10. In addition, at the end of each charge transfer of the read register, the summing operation is shifted 1 pixel so as to obtain an accumulation of the square groups of pixels arranged in quincunx, as indicated in bold characters in the matrix half 106 of FIG. 3. The sequence of phases PH-I, PH-M and PH-L described in the foregoing, which are preferably controlled by a computer program, is within the grasp of a person skilled in the art. It can be demonstrated that thus, irrespective of the position of the image spot in the matrix 10, one of the square groups cumulates at least one third of the star signal. It will be noted that, all other conditions being the same, one can form square groups of 9 pixels, instead of square groups of 4 pixels. On the other hand, it is alternatively possible to employ a matrix which does not have a memory zone, and consequently is only formed by the portions 105, 107 and 108. The search stage having consisted in determining with an accuracy of one pixel, the position of the centre 0' of the image spot, the measuring field, comprised in the search window, is then centred at the 4 (respectively 9) pixels whose global level is the highest. The measuring stage(s) which follow after a search stage and which are not within the framework of the present invention, then render it possible to attain a precision of the order of 0.1 pixel for the coordinates $x_0$ and $y_0$ of the point 0'.

The main advantage of the embodiment shown in FIG. 3 is its immunity to noise; actually, one thus avoids the cumulation, at the same time as the integrated signal, of the read noise linked with each pixel namely the inherent noise of the detector, of the noise caused by the analog processing chain (conventional, not shown, at the output of the stage 108) and of the quantization noise during the subsequent conversion of the analog signal into a digital signal. A further advantage is that the accumulation in pairs (or three lines, respectively) of the lines in the read register renders it possible to divide by two (or three, respectively) the read time in the matrix 10.

Figure 4:
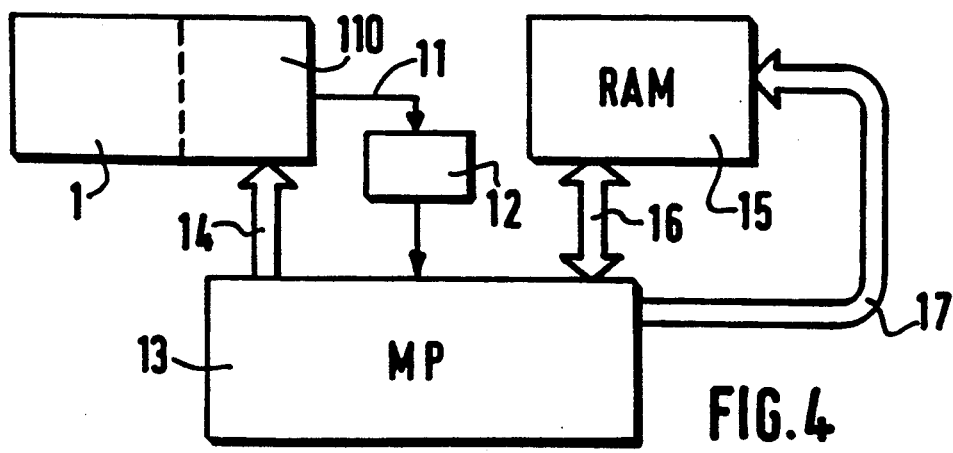
FIG. 4 is a block circuit diagram of a second embodiment of the invention.

A second embodiment of the invention is shown in FIG. 4. In FIG. 4 there are represented a position detector (viewfinder) 1 provided with a detection matrix 110. Reading pixels from the matrix 110 (with or without memory zone) is effected in a conventional, known manner, that is to say pixel-sequentially in the output stage (see 108 in FIG. 3). The analog signal is applied by an output conductor 11 to an analog-to-digital converter 12 connected to a microprocessor MP, 13. The microprocessor 13 controls via a control bus 14, the assembly (1, 110), more specifically the control stages PH-I, PH-M and PH-L; it has its other end connected to a memory 15 via a bidirectional data bus 16 and via an address bus 17. During a reading action in the search stage of the matrix 110, the image information is recovered in digital form in the memory 15 in the write state. Thereafter the memory RAM is read by summing in square groups all the representative numbers of 4 or 9 pixels. These sums are thereafter compared to each other in such a manner that only the highest sum is preserved, the point 0' searched for being the centre of the group corresponding to this maximum sum. Taking again, for example, the configuration of E'5 shown in FIG. 3, the square group having the maximum signal will not be the group shown in 108 but the group:

(i, j-1)+(i+1, j-1)+(i, j)+(i+1, j)

which collects a total signal having a value larger than the value shown at 108. As is shown in FIG. 3, the search is limited to a detection sub-matrix whose number of pixels is of the same order as the number of memory locations of the RAM 15. This second embodiment renders it possible to obtain in a systematic manner the square group of pixels that has received the maximum degree of illumination, which is not always the case for the first embodiment of FIG. 3. On the other hand, this second embodiment is not optimal as regards the signal-to-noise ratio. A further advantage of the first embodiment compared with the second, already mentioned above, is that in spatial applications, the search can be effected in real time thus saving memory capacity. On the other hand, the second embodiment allows a better separation between stars having luminosities which are near to each other, which renders this embodiment particularly suitable for the observation of stars.

The present invention relates in a general manner to the detection of the direction of an emissive source an image of which has been formed on the sensitive zone of a charge coupled detector, more specifically to the tracking of a hot spot in the infrared range and to the repeated detection of the position of stars (or planets) of a high magnitude and having a high apparent speed of travel in the presence of an important background level, in which case the display of the image spot linked with the integration time actually renders the useful signal level very close to the background noise. The viewfinder in accordance with the invention may alternatively be used with good results on earth, in association with a telescope, for example to determine where to point the latter on the canopy of heaven, as well as on board of an artificial satellite to determine its orientation in support of its inertial station.

The charge coupled detector described in the foregoing is, in a conventional manner, sensitive to photons whose wavelengths are located in the absorption spectrum of silicon, i.e. 0.4 to 1.1$\mu$. However, these ad hoc depositions performed on the detection matrix make it possible to render the latter sensitive to ultraviolet rays (band from 0.25$\mu$ to 0.4$\mu$). It is also possible to provide charge coupled detectors which are sensitive to infrared radiation, to electrons or to X-rays.

We claim:
1. A device for determining in the search mode the direction of a low-luminosity emissive source, having a lens forming an image of the said emissive source on a photo-sensitive detector constituted by a change-coupled detection matrix comprising a read register and an output stage of the read register, charactized in that, in accordance with a first preferred embodiment, it further includes read means for reading a detection sub-matrix containing the said image, in groups of 4 or 9 pixels arranged in a square, the said reading operation being performed by successively transferring in the read register lines arranged in groups of 2 or 3 lines, thereafter by successively transferring in the output stage elements of the read register arranged in groups of 2 or 3 elements, whilst shifting two successive transfers from the read register for the duration of an element of this register so as to obtain read signals groups of 4 or 9 pixels of the sub-matrix arranged in a quincunx and to determine in this way the square zone of 4 or 9 pixels of the sub-matrix in correspondence with the said image in the sub-matrix.

2. A device for determining in the search mode the direction of a low-luminosity emissive source, having a lens forming an image of the said emissive source on a photo-sensitive detector constituted by a charge-coupled detection matrix comprising a read register and an output stage of the read register, characterized, in that it further includes storage means for storing the read signal coming from a detection sub-matrix, containing the said image, pixel-sequentially, and read and information calculating means constituted by a microprocessor for:

extracting from said storage means the information of the assembly formed by the separate groups of 4 and 9 pixels, respectively, arranged in a square, group by group, adding together the information contained in the memory location of each group, determining the square zone of 4 and 9 pixels, respectively, of the brightest of the sub-matrix corresponding to the said image in the sub-matrix.

3. A device as claimed in claim 1 or 2 to detect the position of low-luminosity stars in the presence of significant background noise.

4. Applying the device as claimed in claim 2 to stellar observation to discriminate between stars whose luminosities are near to each other in the detection sub-matrix.

* * * * *